United States Patent
Yatake

(10) Patent No.: US 9,951,238 B2
(45) Date of Patent: Apr. 24, 2018

(54) INK-JET INK, INK CARTRIDGE, INK-JET RECORDING METHOD

(71) Applicant: Seiko Epson Corporation, Tokyo (JP)

(72) Inventor: Masahiro Yatake, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/413,862

(22) Filed: Jan. 24, 2017

(65) Prior Publication Data
US 2017/0226356 A1   Aug. 10, 2017

(30) Foreign Application Priority Data

Feb. 9, 2016   (JP) ................................. 2016-022437

(51) Int. Cl.
| | | |
|---|---|---|
| *C09D 11/102* | (2014.01) | |
| *C09D 11/322* | (2014.01) | |
| *B41J 2/175* | (2006.01) | |

(52) U.S. Cl.
CPC ......... *C09D 11/322* (2013.01); *B41J 2/17523* (2013.01); *C09D 11/102* (2013.01)

(58) Field of Classification Search
CPC ... C09D 11/023; C09D 11/102; C09D 11/322; C09D 175/04
See application file for complete search history.

(56) References Cited

U.S. PATENT DOCUMENTS

| | | | |
|---|---|---|---|
| 5,053,317 A * | 10/1991 | Joerg | ............ G03F 7/035 430/281.1 |
| 8,426,547 B2 | 4/2013 | Su et al. | |
| 8,757,788 B2 | 6/2014 | Okamura et al. | |
| 8,911,071 B2 | 12/2014 | Nishino et al. | |
| 2010/0093927 A1* | 4/2010 | Roberts | ............ C08G 18/0823 524/591 |
| 2012/0249663 A1* | 10/2012 | Okumura | ............ C09D 11/322 347/20 |
| 2013/0022746 A9 | 1/2013 | Spinelli et al. | |

FOREIGN PATENT DOCUMENTS

| | | |
|---|---|---|
| JP | 2006-022132 A | 1/2006 |
| JP | 2011-144345 A | 7/2011 |
| JP | 2011-144354 A | 7/2011 |
| JP | 2012-140602 A | 7/2012 |
| JP | 2013-035897 A | 2/2013 |
| JP | 2014-240451 A | 12/2014 |
| JP | 2015-045001 A | 3/2015 |

* cited by examiner

*Primary Examiner* — Kristal Feggins
*Assistant Examiner* — Kendrick Liu
(74) *Attorney, Agent, or Firm* — Harness, Dickey & Pierce, P.L.C.

(57) ABSTRACT

An ink-jet ink of the invention is an ink-jet ink using a pigment and includes polymer particles containing an urethane polymer which includes at least repeating units derived from a polycarbonate diol, repeating units derived from an alicyclic isocyanate, and repeating units derived from an acid group-containing diol, which has an acid value of from 5 to 30 mgKOH/gm, and in which the number of urethane groups is 10 times or more the number of urea groups. The content of the polymer particles is from 0.5 to 3 times the content of the pigment.

15 Claims, No Drawings

INK-JET INK, INK CARTRIDGE, INK-JET RECORDING METHOD

BACKGROUND

1. Technical Field

The present invention relates to an ink-jet ink, an ink cartridge, and an ink-jet recording method.

2. Related Art

Besides printing of business documents including characters, graphic charts, and the like performed on a recording media, such as plain paper, an ink-jet recording method has started to be used for printing performed on textiles and films, and the usage frequency thereof for various types of applications as described above has been increased. In the applications as described above, an image is required to have excellent chromogenic property and toughness (such as scratch resistance, light resistance, ozone gas resistance, and water resistance), and hence, an ink containing a pigment as a colorant has been frequently used.

Compared to an ink using a dye as a colorant, a printed media printed using a pigment ink has a high chromogenic property. The reason for this is that a pigment component is likely to be localized on the surface of a recording medium. The reason for this is that although a dye infiltrates to the inside of a recording medium, a pigment is likely to be agglomerated when a vehicle component evaporates or infiltrates in a step in which an ink is adhered to a recording medium or in a step performed thereafter. However, in the pigment ink, since the pigment functioning as a colorant is likely to be present on the surface of the recording medium, a printed media printed using the pigment ink is disadvantageously inferior in terms of scratch resistance.

Accordingly, in order to improve the scratch resistance of a printed media printed by the pigment ink, the addition of urethane resin particles to the ink has been investigated (for example, see JP-A-2006-22132, 2012-140602, 2013-35897, 2014-240451, 2011-144345, and 2015-45001).

SUMMARY

However, since the related urethane resin particles as described above each have many polar groups, such as a hydrophilic group and an urethane group, when a large amount of the above particles is used for a water-based ink, the ink viscosity is increased. In ink-jet printing, when the ink viscosity is increased, the ejection of the ink becomes unstable, and clogging is liable to occur; hence, the addition amount of the resin is restricted. As a result, the printed media thus obtained is not able to have sufficient fixability and scratch resistance. As described above, an ink containing related urethane-based polymer particles has problems in that a clogging recovery property is inferior and an image excellent in scratch resistance cannot be recorded.

Hence, an advantage of some aspects of the invention is to solve at least some of the problems described above and is to provide an ink-jet ink, an ink cartridge using this ink-jet ink, and an ink-jet recording method, each of which is able to record an image excellent in scratch resistance while the clogging recovery property is secured.

The invention was made to solve at least some of the problems described above and can be realized by the following aspects or the application examples.

APPLICATION EXAMPLE 1

An ink-jet ink according to an aspect of the invention is an ink-jet ink using a pigment; the ink-jet ink comprises polymer particles containing an urethane polymer which includes at least repeating units derived from a polycarbonate diol, repeating units derived from an alicyclic isocyanate, and repeating units derived from an acid group-containing diol, which has an acid value of from 5 to 30 mgKOH/gm, and in which the number of urethane groups is 10 times or more the number of urea groups; and the content of the polymer particles is from 0.5 to 3 times the content of the pigment.

According to the aspect of the application example 1, there can be provided an ink-jet ink which is able to record an image excellent in scratch resistance while the clogging recovery property is secured.

APPLICATION EXAMPLE 2

In the above application example, the weight average molecular weight of the polycarbonate diol may be set to from 500 to 3,000.

APPLICATION EXAMPLE 3

In the above application example, the urethane polymer may further include repeating units derived from an alkylene glycol.

APPLICATION EXAMPLE 4

In the above application example, the alicyclic isocyanate may be at least one type selected from the group consisting of 4,4'-dicyclohexylmethane diisocyanate and hydrogenated xylylene diisocyanate.

APPLICATION EXAMPLE 5

In the above application example, as the alicyclic isocyanate, a blocked alicyclic polyisocyanate compound in which 80% or more of the aromatic ring of an aromatic polyisocyanate is hydrogenated may be included.

APPLICATION EXAMPLE 6

In the above application example, the polymer particles have a gel fraction of 50% or more.

APPLICATION EXAMPLE 7

An ink cartridge according to another aspect of the invention is an ink cartridge comprising an ink receiving portion receiving an ink, and the ink is the ink-jet ink described in one of the above application examples 1 to 6.

According to the aspect of the application example 7, there can be provided an ink cartridge comprising an ink receiving portion receiving an ink which is able to record an image excellent in scratch resistance while the clogging recovery property is secured.

APPLICATION EXAMPLE 8

An ink-jet recording method according to another aspect of the invention is an ink-jet recording method which records an image on a recording medium by ejecting an ink from an ink-jet type recording head, and the ink is the ink-jet ink described in one of the above application examples 1 to 6.

According to the aspect of the application example 8, since recording is performed by using an ink-jet ink which is able to record an image excellent in scratch resistance while the clogging recovery property is secured, while the clogging recovery property is secured, an image excellent in scratch resistance can be recorded.

DESCRIPTION OF EXEMPLARY EMBODIMENTS

Hereinafter, preferable embodiments of the invention will be described in detail. However, the invention is not limited to the following embodiments, and various modified examples performed without departing from the scope of the invention are also included in the invention.

1. Ink-Jet Ink, Ink Cartridge, and Ink-Jet Recording Method

Hereinafter, an ink-jet ink, an ink cartridge, and an ink-jet recording method according to this embodiment will be described.

1.1. Ink-Jet Ink

An ink-jet ink according to one embodiment of the invention is an ink-jet ink using a pigment; the ink-jet ink comprises polymer particles containing an urethane polymer which includes at least repeating units derived from a polycarbonate diol, repeating units derived from an alicyclic isocyanate, and repeating units derived from an acid group-containing diol, which has an acid value of from 5 to 30 mgKOH/gm, and in which the number of urethane groups is 10 times or more the number of urea groups; and the content of the polymer particles is from 0.5 to 3 times the content of the pigment.

Although an urethane resin formed from an urethane polymer is a resin formed by polymerization using a (poly) isocyanate, an urethane resin used for an ink-jet ink is formed by polymerization using at least a polyisocyanate and a polyol and/or a polyamine, and if necessary, a polyol and/or a polyamine, each of which functions as a cross-linking agent or a chain extender, may also be used.

In addition, in the case of an aqueous system, in order to introduce a carboxylic acid, a material, such as dimethylol propionic acid, having both a hydroxy group and a carboxyl group is used. An urethane resin obtained by polymerization using the components as described above is formed of two types of segments, that is, is primarily formed of hard segments and soft segments. The hard segment is formed, for example, of a polyisocyanate, a short-chain polyol and/or a short-chain polyamine, and a cross-linking agent and/or a chain extender, and is believed to contribute to the strength of the resin. On the other hand, the soft segment is formed of a long-chain polyol and the like and is believed to primarily contribute to the flexibility of the resin. Since those hard segments and soft segments have a microphase separation structure, a film formed of the urethane resin simultaneously has the strength and the flexibility and also has a high elasticity. The characteristics of the urethane resin film as described above contribute to the improvement in scratch resistance of a printed media.

In order to improve the scratch resistance of a printed media to be printed by a pigment ink, the present inventor investigated various types of urethane resins. As a result, it was found that by addition of an urethane resin to an ink-jet ink, although the scratch resistance of an image to be recorded is improved, the clogging recovery property of the ink is degraded. Hence, in order to improve the clogging recovery property of an ink, the increase in hydrophilic property of an urethane resin was investigated by increasing the acid value thereof. As a result, it was found that when the acid value of the urethane resin is excessively increased, although the clogging recovery property of the ink is improved, the scratch resistance and the water resistance of a printed media are degraded.

Since the urethane resin is primarily formed of a polyisocyanate and a component to react therewith, when the acid value of the urethane resin is increased in order to improve the clogging recovery property of the ink, the rate of a short-chain polyol, such as an acid group-containing diol, is to be increased. As a result, the rate of a long-chain polyol which is a component to react with a polyisocyanate as is the short-chain polyol is decreased. In this case, the increase in number of urethane bonds of the urethane resin and the decrease in number of soft segments thereof occur, so that the flexibility of the urethane resin film is degraded. Hence, when the hydrophilic property of the urethane resin is improved by increase in acid value thereof, although the clogging recovery property and intermittent ejection stability of the ink are improved, the scratch resistance and the water resistance of an image are degraded. The reason the scratch resistance of the image recorded by the ink disclosed in JP-A-2013-35897 described above is inferior is a high acid value.

Accordingly, instead of using the method of improving the hydrophilic property of the urethane resin by increasing the acid value thereof, the present inventor investigated a method of capable of satisfying the scratch resistance of an image together with the clogging recovery property and the intermittent ejection stability of the ink in the state in which the acid value is decreased to a certain extent. In particular, in the state in which the acid value of the urethane resin is decreased to 5 to 30 mgKOH/g, various compositions of the urethane resin were investigated. As a result, it was found effective that as a portion formed by a polyisocyanate which forms the urethane resin, a specific polyfunctional polyisocyanate is used, and the number of urethane groups is set to 10 times or more the number of urea groups.

Furthermore, it was also found that although the effect varies depending on the type of pigment, in the case in which the addition amount of a pigment which is generally used is 1% or more, when the addition amount of the polymer particles is set to 0.5 to 3 times that of the pigment, while the clogging recovery property is secured, an ink capable of recording an image excellent in scratch resistance can be provided.

Hereinafter, individual components contained in the ink-jet ink (hereinafter, simply referred to as the "ink" in some cases) according to this embodiment will be described.

1.1.1. Pigment

The ink-jet ink according to this embodiment contains a pigment as a colorant. In the ink-jet ink according to this embodiment, as a pigment dispersion type, a self-dispersion pigment dispersible without using a dispersant or a resin-dispersion pigment using a resin, such as an acrylic-styrene resin or an acrylic resin, other than an urethane resin is preferably used. The reason for this is that when a dispersion resin is an urethane-based resin, the dispersion is liable to be destroyed by the interaction with the polymer particles containing an urethane polymer which will be described later, and in particular, the reason is that the viscosity of an ink under a high-temperature condition is increased.

The pigment to be used for the ink-jet ink according to this embodiment is at least one type of a pigment (surface-treated pigment) in which an anionic group is bonded to particle surfaces directly or indirectly with another atomic group provided therebetween and a pigment dispersed by a resin having an anionic functional group. As the pigment types as described above, for example, there may be used an inorganic pigment, such as carbon black, calcium carbonate, or titanium oxide; or an organic pigment, such as an azo pigment, an isoindoline pigment, a diketopyrrolopyrrole pigment, a phthalocyanine pigment, a quinacridone pigment, or an anthraquinone pigment.

As the pigment in which an anionic group is bonded to particle surfaces directly or indirectly with another atomic group provided therebetween, for example, there may be mentioned a pigment in which a functional group including an anionic group is bonded to surfaces of pigment particles or a pigment in which an anionic resin is bonded to surfaces of pigment particles. In addition, as the pigment dispersed by a resin having an anionic functional group, for example, there may be mentioned a pigment in which an anionic resin is physically adsorbed on surfaces of pigment particles or a pigment in which pigment particles are enclosed with an anionic resin.

The self-dispersion pigment in which a functional group including an anionic group is bonded to surfaces of pigment particles is a pigment in which an anion group, such as —COOM, —SO$_3$M, —PO$_3$HM, or —PO$_3$M$_2$, is bonded to surfaces of pigment particles directly or indirectly with another atomic group provided therebetween. As M, for example, there may be mentioned a hydrogen atom, lithium, sodium, potassium, ammonium (NH$_4$), or an organic amine, such as methylamine, ethylamine, monoethanolamine, diethanolamine, or triethanolamine. In addition, as the another atomic group, for example, there may be mentioned a linear or a branched alkylene group having 1 to 12 carbon atoms, a phenylene group, a naphthylene group, an amide group, a sulfonyl group, an amino group, a carbonyl group, an ester group, an ether group, or a group formed of those groups mentioned above in combination.

As those self-dispersion pigments, for example, a pigment in which an anionic group is bonded to surfaces of pigment particles by an oxidation treatment in accordance with a known method and a pigment in which a functional group including an anionic group is bonded to surfaces of pigment particles by diazo coupling or the like may be mentioned, and those pigments are both preferably used. The self-dispersion pigment in which an anionic resin is bonded to surfaces of pigment particles is a pigment in which a resin having as a hydrophilic unit, a unit containing at least an anionic group is bonded to surfaces of pigment particles directly or indirectly with another atomic group provided therebetween.

The resin dispersion pigment in which an anionic resin is physically adsorbed on surfaces of pigment particles and the resin dispersion pigment in which pigment particles are enclosed with an anionic resin are each a dispersion type using a resin dispersant. As the resin dispersant, a copolymer having a hydrophilic group and a hydrophobic group is used.

As the resin dispersant used for the resin dispersion pigment, any known resin usable for an ink-jet ink may be used. As a preferable resin dispersant, a dispersant is required to have at least anionic group as a hydrophilic group. As the hydrophilic group, for example, a hydrophilic monomer, such as (meth)acrylic acid or its salt, may be mentioned. In addition, as the hydrophobic group, for example, there may be mentioned a functional group of a hydrophobic monomer including a monomer, such as styrene, its derivative, or benzyl (meth)acrylate, having an aromatic ring, and a monomer, such as an (meth)acrylate ester, having an aliphatic group.

As a resin to be used as the resin dispersant, a resin having a weight average molecular weight of from 10,000 to 100,000 and furthermore from 30,000 to 80,000 or a resin having an acid value of from 50 to 150 mgKOH/g is preferable. In the invention, a styrene-(meth)acrylic resin or a (meth)acrylic resin having an acid value of from 50 to 150 mgKOH/g is more preferably used as the dispersant. When a dispersion type using a dispersant is employed, the mass rate of the resin dispersant/the pigment is set to 0.1 to 10.0 times and is preferably set to 0.5 to 5.0 times.

As described below, the content of the pigment in the ink is preferably set so that the content of the polymer particles containing an urethane polymer in which the number of urethane groups is 10 times or more the number of urea groups is from 0.5 to 3 times the content of a solid component of the pigment. In addition, based on the total ink mass (100 percent by mass), the content of the pigment is preferably 0.1 to 15.0 percent by mass and more preferably 1.0 to 10.0 percent by mass. When the addition amount of the polymer particles is less than 0.5 times that of the pigment, a sufficient fixing property cannot be obtained. When the content of the pigment in the ink is in the range described above, the increase in viscosity is not likely to occur, and the clogging recovery property and the intermittent ejection stability can be obtained.

1.1.2. Polymer Particles (Urethane Resin) Containing Urethane Polymer

The ink-jet ink according to this embodiment contains polymer particles containing an urethane polymer. This urethane polymer includes at least repeating units derived from a polycarbonate diol, repeating units derived from an alicyclic isocyanate, and repeating units derived from an acid group-containing diol, the acid value of the urethane polymer is from 5 to 30 mgKOH/g, and the number of urethane groups is 10 times or more the number of urea groups.

The urethane polymer as described above is obtained by a reaction at least using a polycarbonate diol, an alicyclic isocyanate, and an acid group-containing diol. In the ink-jet ink according to this embodiment, an urethane resin contained as the polymer particles is obtained by using at least a polycarbonate diol, an alicyclic isocyanate, and an acid group-containing diol, and hence, the film strength, the scratch resistance, the water resistance, the ink storage stability, the intermittent ejection stability, and the continuous ejection stability are excellent, and in particular, the clogging recovery property at a high temperature is excellent.

The polymer particles containing the urethane polymer to be used for the ink-jet ink according to this embodiment can be obtained by a known urethane resin polymerization method. The manufacturing method will be described with reference to examples.

When a polyfunctional polyisocyanate and a compound (such as a polyol and/or a polyamine) to react therewith are allowed to reach with each other, the amount of the polyisocyanate is set larger so as to form a prepolymer having an isocyanate group at the terminal of its molecule by polymerization. In this case, if needed, a method may be used in which after an organic solvent, such as methyl ethyl ketone, acetone, or tetrahydrofuran, having a boiling point of 100° C. or less is used, the solvent mentioned above is removed by an evaporator or the like, or a method may also be used in which a solvent, such as N-methylpyrrolidone, 2-pyrrolidone, or a glycol ether, having a boiling point of 100° C. or more is used and is allowed to remain in an urethane resin dispersion. Those methods are each generally called a prepolymer method.

For example, as is the case of the ink-jet ink according to this embodiment, when the resin is dispersed in an aqueous system, since an acid group-containing diol is used as a raw material, the acid group of the prepolymer is neutralized using a neutralizing agent, such as at least one of organic bases including N,N-dimethylethanolamine, N,N-diethylethanolamine, diethanolamine, triethanolamine, triisopropanolamine, trimethylamine, and triethylamine, or at least one of inorganic bases including sodium hydroxide, potassium hydroxide, and ammonia. When a neutralizing agent, such as sodium hydroxide or potassium hydroxide, containing an alkali metal is used, the dispersion stability of the urethane resin is improved. Those neutralizing agents are each used with respect to 1 mole of the acid group of the prepolymer, preferably in an amount of 0.5 to 1.0 mole and more preferably in an amount of 0.8 to 1.0 mole, and as a result, the increase in viscosity is not likely to occur, and the workability is improved. Subsequently, the prepolymer is added to a liquid containing a chain extender and/or a cross-linking agent, so that a chain extension reaction and/or a cross-linking reaction is performed. Next, when an organic solvent is used, if necessary, the solvent is removed using an evaporator or the like, so that a dispersion of the urethane resin is obtained.

As a catalyst used for an urethane polymerization reaction, for example, a titanium catalyst, an aluminum catalyst, a zirconium catalyst, an antimony catalyst, a germanium catalyst, a bismuth catalyst, or a metal complex-based catalyst is preferable. In particular, as the titanium catalyst, a tetraalkyl titanate, such as tetrabutyl titanate or tetramethyl titanate, or an oxalic acid metal salt, such as potassium titanate oxalate, is preferable. In addition, as another catalyst, a known catalyst may be used without any particular restriction, and for example, a tin compound, such as dibutyl tin oxide or dibutyl tin dilaurate, may be mentioned. As a non-heavy metal catalyst, it has been known that an acetylacetonato complex of a transition metal, such as titanium, iron, copper, zirconium, nickel, cobalt, or manganese, has an urethanation activity. In recent years, as many attentions have been increasingly paid to environmental issues, a low toxic catalyst has been desired instead of using a heavy metal catalyst, and in particular, a titanium/zirconium compound having a high urethanation activity has drawn attention. Accordingly, since development of novel catalysts has been actively pursued, those catalysts mentioned above may also be used.

Alicyclic Isocyanate

For the urethane polymer used for the ink-jet ink according to this embodiment, as a polyfunctional polyisocyanate used for a polymerization method of the above urethane resin, an alicyclic isocyanate may be used.

As an example of the alicyclic isocyanate used for the ink-jet ink according to this embodiment, in particular, a polyisocyanate having a cyclic structure, such as 4,4'-dicyclohexylmethane diisocyanate (hydrogenated MDI), methylcyclohexylene diisocyanate, 1,3-bis(isocyanate methyl) cyclohexane, 1,4-cyclohexane diisocyanate, or hydrogenated xylylene diisocyanate (hydrogenated XDI), is preferable. Since the ink-jet ink according to this embodiment uses at least one of the polyisocyanates mentioned above, the film strength is increased, and the scratch resistance is improved.

The ink-jet ink according to this embodiment preferably contains as the alicyclic isocyanate, a blocked alicyclic polyisocyanate compound in which 80% or more of the aromatic ring of an aromatic polyisocyanate compound is hydrogenated. In the ink-jet ink according to this embodiment, since the blocked alicyclic polyisocyanate compound is used as the polyfunctional polyisocyanate, the film strength is further increased, and the scratch resistance is improved.

Besides the alicyclic isocyanate, the ink-jet ink according to this embodiment may use another polyisocyanate so as not to adversely influence the characteristics of the ink-jet ink according to this embodiment.

As a usable aliphatic polyisocyanate, for example, there may be mentioned a polyisocyanate, such as tetramethylene diisocyanate, hexamethylene diisocyanate, dodecamethylene diisocyanate, 2,2,4,-trmethylhexamethylene diisocyanate, 2,4,4-trimethylhexamethlene diisocyanate, lysine diisocyanate, 2-methylpentane-1,5-diisocyanate, or 3-methyl-1,5-pentane diisocyanate, having a chain structure or isophorone diisocyanate.

As the aromatic polyisocyanate, for example, there may be mentioned tolylene diisocyanate, xylylene diisocyanate, 4,4'-dibenzyl diisocyanate, 1,3-phenylene diisocyanate, 1,4-phenylene diisocyanate, dialkyl diphenylmethane diisocyanate, tetraalkyl diphenylmethane diisocyanate, α,α,α,α-tetramethylxylylene diisocyanate, 2,2'-diphenylmethane diisocyanate, 2,4-diphenylmethane diisocyanate, 4,4'-diphenylmethane diisocyanate, or 1,5-naphtylene diisocyanate.

Polycarbonate Diol

For the urethane polymer used for the ink-jet ink according to this embodiment, as a polyol used for a polymerization method of the above urethane resin, a polycarbonate diol may be used.

A polyurethane using a polycarbonate diol or the like is believed to have the best durability in terms of the heat resistance and the hydrolysis resistance and has been widely used as a durable film, an automobile artificial leather, a paint, or an adhesive. In particular, as a polycarbonate diol usable in the invention, an alkane diol-based polycarbonate diol, such as a polyhexamethylene carbonate diol, may be mentioned, and for example, a polycarbonate diol obtained by a reaction of a carbonate component, such as an alkylene carbonate, a diaryl carbonate, or an dialkyl carbonate, or phosgene with an aliphatic diol component may also be mentioned.

As a polycarbonate diol usable in the invention has, in general, two hydroxy groups in its molecule and may be obtained by an ester exchange reaction between a diol compound and a carbonate ester. As the diol compound, for example, there may be mentioned 1,4-butanediol, 1,3-butanediol, 1,2-butanediol, 1,5-pentanedio, 1,2-pentanedio, 1,6-hexanediol, 1,5-hexanediol, 1,2-hexanediol, 1,7-heptanediol, 1,8-octanediol, 1,2-octanediol, 1,9-nonaediol, 1,10-decanediol, neopentyl glycol, 2-methyl-1,3-propanediol, 2-methyl-1,8-octanediol, 2-isopropyl-1,4-butanediol, 2-ethyl-1,6-hexanediol, 3-methyl-1,5-pentanediol, 2,4-dimethyl-1,5-pentanediol, 2,4-diethyl-1,5-pentanediol, 1,3-butanediol, 2-ethyl-1,3-hexanediol, 2-butyl-2-ethyl-1,3-propanediol, 1,4-cyclohexanedimethanol, 1,3-cyclohexanediol, or 1,4-cyclohexanediol. In addition, those diols mentioned above may be used alone, or at least two types thereof may be used in combination.

As the polycarbonate diol, a commercially available product may also be used, and for example, there may be mentioned BENEBiOL Series, such as NL1010DB, NL2010DB, NL3010DB, NL1010B, NL2010B, NL3010B, NL1050DB, NL2050DB, and NL3050DB, each of which is manufactured by Mitsubishi Chemical Corp.; Duranol Series manufactured by Asahi Kasei Corp.; Nippolan Series manufactured by Tosoh Corp.; polyhexanediol carbonate manufactured by Kuraray Co., Ltd.; Plaque Cell Series such as CDCD205PL, manufactured by Daicel Corp; and ETERNACOLL Series manufactured by Ube Industries, Ltd.

The weight average molecular weight of the polycarbonate diol is preferably from 500 to 3,000. When the weight average molecular weight is less than 500, since the number of urethane bonds is increased, and the rigidity of the polyol is increased, the strength of the urethane resin film tends to increase, and the scratch resistance is improved; however, the intermittent ejection stability and the clogging recovery property are degraded. In addition, when the weight average molecular weight of the polycarbonate diol is more than 3,000, since the number of urethane bonds is decreased, and the extensibility of the polyol is increased, the flexibility of the urethane resin film is increased, the tackiness is generated, and the scratch resistance is degraded. Hence, when the weight average molecular weight of the polycarbonate diol is from 500 to 3,000, the balance between the strength and the flexibility of the urethane resin film is improved, and hence, the scratch resistance of an image to be recorded can be significantly improved.

Acid Group-Containing Diol

For the urethane polymer used for the ink-jet ink according to this embodiment, as a polyol used for a polymerization method of the above urethane resin, an acid group-containing diol may also be used.

As the acid group-containing diol, for example, dimethylol acetic acid, dimethylol propionic acid, or dimethylol butyric acid may be mentioned. In addition, dimethylol propionic acid or dimethylol butyric acid is preferably used. Besides the acid group-containing diols mentioned above, a polyol, such as a polyhydroxy polyacrylate, a polyhydroxy polyester amide, a polyhydroxy polyacetal, or a polyhydroxy polythioether, may also be used so as not to adversely influence the characteristics of the ink-jet ink of the invention.

Alkylene Glycol

For the urethane polymer used for the ink-jet ink according to this embodiment, as a polyol used for a polymerization method of the above urethane resin, an alkylene glycol is also preferably used.

In the ink-jet ink according to this embodiment, when the urethane polymer includes repeating units derived from an alkylene glycol, the film strength is increased, and the scratch resistance of a recorded material is improved. The reason for this is believed that since an alkylene glycol having a small molecular weight intrudes into a three-dimensional network structure of the polycarbonate diol and reacts with an isocyanate to form an urethane group, a stronger film is formed.

As an example of a usable alkylene glycol, for example, there may be mentioned ethylene glycol, diethylene glycol, triethylene glycol, tetraethylene glycol, polyethylene glycol, 1,2-propylene glycol, 1,3-propanediol, tripropylene glycol, polypropylene glycol, (poly)tetramethylene glycol, hexamethylene glycol, tetramethylene glycol, neopentyl glycol, 1,2-butanediol, 1,3-butanediol, 1,4-butanediol, 1,2-pentanediol, 1,5-pentanediol, 1,2-hexanediol, 1,6-hexanediol, 3-methyl-1,5-pentanediol, 1,2-cyclohexanediol, 1,4-cyclohexanediol, 1,4-cyclohexanedimethanol, 4,4-dihydroxyphenyl propane, 4,4-dihydroxyphenyl methane, glycerin, trimethylolethane, trimethylolpropane, 1,2,5-hexanetriol, 1,2,6-hexanetriol, pentaerythritol, trimethylol melamine, polyoxypropylene triol, dimethyl-1,3-pentanediol, diethyl-1,3-pentanediol, dipropyl-1,3-pentanediol, dibutyl-1,3-pentanediol, or 2-butyl-2-ethyl-1,3-pentanediol.

The addition amount of each of those alkylene glycols is preferably $1/10$ moles or less of that of the polycarbonate diol. When the amount is more than $1/10$ moles, since an unreacted OH component of the polycarbonate diol is increased, a sufficient film strength may not be obtained.

Other Polyol and Polyamine

For the urethane polymer used for the ink-jet ink according to this embodiment, as a polyol used for a polymerization method of the urethane resin, the following polyol and polyamine may be further used.

As a polyol which may be used so as not to adversely influence the characteristics of the ink-jet ink according to this embodiment, for example, a polyester polyol or a polyether polyol may be mentioned.

As the polyester polyol, for example, an acid ester may be mentioned. As an acid component forming the acid ester, for example, there may be mentioned an aliphatic dicarboxylic acid, such as malonic acid, succinic acid, tartaric acid, oxalic acid, glutaric acid, adipic acid, pimelic acid, suberic acid, azelaic acid, sebacic acid, alkyl succinic acid, linoleic acid, maleic acid, fumaric acid, mesaconic acid, citraconic acid, or itaconic acid; an aromatic dicarboxylic acid, such as phthalic acid, naphthalene dicarboxylic acid, or biphenyl dicarboxylic acid; or an alicyclic dicarboxylic acid, such as tetrahydrophthalic acid or a hydrogenated aromatic dicarboxylic acid. For example, an anhydride, a salt, an alkyl ester, or an acid halide of the acid component of each of the compounds mentioned above may also be used as the acid component.

As the polyether polyol, for example, an addition polymer of an alkylene oxide and a polyol or a (poly)alkylene glycol may be mentioned. As the alkylene oxide, for example, ethylene oxide, propylene oxide, butylene oxide, or an α-olefin oxide may be mentioned. In addition, as the polyol to be addition-polymerized with an alkylene oxide, the component which forms the above polyester polyol described by way of example may be mentioned. As the (poly)alkylene glycol, the component which forms the above polyester polyol described by way of example may be mentioned.

As the polyamine, for example, there may be mentioned ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, hydrazine, polyamide polyamine, or polyethylene polyimine. In addition, as a common compound to be used as a polyamine, there are many compounds each having a molecular weight approximately equivalent to that of a short-chain polyol, and a compound forming an urea group or a biuret group, each of which basically functions as a hard segment of an urethane resin, is used.

Others

For the urethane resin used for the ink-jet ink according to this embodiment, when polymerization is performed, a cross-linking agent and/or a chain extender may also be used. The cross-linking agent is used when a pre-polymer is synthesized, and the chain extender is used when a chain extension reaction is performed after the per-polymer is synthesized. As the cross-linking agent and the chain extender, in accordance with the application, such as the cross-linking or the chain extension, for example, the polyisocyanate, the polyol, and the polyamine mentioned above may be appropriately selected. As the chain extender, a compound capable of cross-linking an urethane resin may also be used.

In addition, the urethane resin is preferably cross-linked by at least one type of structure selected from the group consisting of an allophanate structure, a biuret structure, an uretdione structure, and an isocyanurate structure. Since the number of hard segments is increased when the urethane resin is cross-linked, the microphase separation structure is likely to be formed, and the film strength is increased. Since the urethane bonds are present at a high density, hydrogen bonds are likely to be formed between the urethane bonds, and the degree of density of the hard segments is increased; hence, the microphase separation structure is likely to be formed, and the flexibility of the urethane resin film is increased. Accordingly, since the strength and the flexibility of the urethane resin film can both be increased when the urethane resin is cross-linked, the scratch resistance of a printed media can be improved.

As a method for cross-linking the urethane resin, there may be mentioned a method in which when the urethane resin is synthesized, as the cross-linking agent, a compound having at least three functional groups is used. As the compound having at least three functional groups to be used as the cross-linking agent, among a polyfunctional polyisocyanate, a polyol, and a polyamine, a compound having at least three functional groups may be mentioned. As the polyfunctional polyisocyanate having at least three functional groups, for example, a polyfunctional polyisocyanate having an isocyanurate structure, or a polyfunctional polyisocyanate having an allophanate or a biuret structure may be mentioned. As the cross-linking agent, for example, glycerin, trimethylolpropane, pentaerythritol, or polyoxypropylene triol may be mentioned.

The degree of cross-linking of the urethane resin may be determined by a gel fraction obtained by calculation of the rate of a gel component to a sol component using a phenomenon in which an urethane resin having a cross-linking structure is not dissolved in a solvent but is swelled. The gel fraction is an index showing the degree of cross-linking measured from the solubility of a film-formed urethane resin, and a higher degree of cross-linking shows a higher gel fraction.

The chain extender is a compound to react with an isocyanate group which forms no urethane bond in the polyisocyanate of the pre-polymer. As a compound usable as the chain extender, for example, the aforementioned polyol and polyamine may be mentioned.

Analysis of Urethane Resin

The composition of the urethane resin, the structure of the polyisocyanate, the acid value, the gel fraction, and the rate of urethane groups/urea groups are analyzed by the following methods.

First, a method in which from an ink containing an urethane resin and a pigment, the urethane resin is extracted will be described. By the use of a solvent (such as acetone or methyl ethyl ketone) which dissolves the urethane resin but not the pigment, the urethane resin can be extracted from the ink. Alternatively, after the ink is processed by a centrifugal method, the supernatant is acid-precipitated with an acid, so that the urethane resin may also be extracted.

(A) Composition of Urethane Resin

The urethane resin is dissolved in deuterated dimethyl sulfoxide (DMSO-d6) to form a sample, and analysis thereof is performed by a proton nuclear magnetic resonance method (1H-NMR) or a carbon 13 nuclear magnetic resonance method ($^{13}$C-NMR). From the peak positions obtained thereby, the types of polyisocyanate, polyol, polyamine, and the like can be confirmed. Furthermore, from the integrated value of the peak of the chemical shift of each component, the composition rate can also be calculated. In addition, by analysis of the urethane resin using a pyrolytic gas chromatography (GC-MS), the types of polyisocyanate, polyol, polyamine, and the like may also be confirmed. In addition, by analysis using a carbon 13 nuclear magnetic resonance method ($^{13}$C-NMR), the number of repeating units of a long-chain polyol is obtained, and the number average molecular weight can also be calculated.

(B) Structure of Polyisocyanate

From an infrared spectrum obtained by analysis of the urethane resin using a Fourier transform infrared spectroscopic analyzer (FT-IR), the structure of a polyisocyanate can be confirmed. The main absorptions are as follows. The allophanate structure has a NH stretching vibration absorption at 3,300 $cm^{-1}$ and two C=O stretching vibration absorptions at 1,750 to 1,710 $cm^{-1}$ and 1,708 to 1,653 $cm^{-1}$. The uretdione structure has a C=O stretching vibration absorption at 1,780 to 1,755 $cm^{-1}$ and an absorption at 1,420 to 1,400 $cm^{-1}$ based on an uretdione ring. The isocyanurate structure has a C=O stretching vibration absorption at 1,720 to 1,690 $cm^{-1}$ and an absorption at 1,428 to 1,406 $cm^{-1}$ based on an isocyanurate ring. The biuret structure has a C=O stretching vibration absorption at 1,720 to 1,690 $cm^{-1}$.

(C) Acid Value of Urethane Resin

The acid value of the urethane resin can be measured by a titration method. The acid value is measured using AT610 (product name) manufactured by Kyoto Electronics Manufacturing Co., Ltd., and calculation is performed by introducing numerical values in the following formula (1).

$$\text{Acid value}(mg/g) = (EP1-BL1) \times FA1 \times C1 \times K1 / \text{SIZE} \quad (1)$$

(In the above formula, EP1 represents a titration amount (mL), BL1 represents a blank value (0.0 mL), FA1 represents a factor (1.00) of the titration liquid, C1 represents a concentration conversion value (5.611 mg/mL) (equivalent to the amount of potassium hydroxide in 1 mL of a KOH solution at a concentration of 0.1 mol/L), K1 represents a factor (1), and SIZE represents the sample amount (g).)

By a colloid titration using a potential difference, the acid value of the urethane resin dissolved in tetrahydrofuran is measured. As a titration agent used in this case, an ethanol solution of sodium hydroxide may be used.

(D) Gel Fraction

An urethane-containing solution is prepared by adding the urethane resin to water. By the use of this solution, an urethane resin film having a uniform thickness is formed. This film is dipped in tetrahydrofuran and is held at an environmental temperature of 40° C. for 48 hours. Subsequently, from the mass of a remaining component (gel) which is not dissolved, the gel fraction is calculated.

(E) Rate of Urethane Groups/Urea Groups

The rate of urethane groups/urea groups of the urethane resin can be obtained from the rate in integrated value of the peak of the urethane group to that of the peak of the urea group by analysis of the urethane resin dissolved in deuterated dimethyl sulfoxide (DMSO-d6) using a carbon 13 nuclear magnetic resonance method ($^{13}$C-NMR). However, the positions of the peaks of the urethane group and the urea group are shifted by the type of compound used for synthesis of the urethane resin. Hence, the positions of the peaks of the urethane group and the urea group of the compound used for the synthesis of the urethane resin are required to be investigated in advance.

By the methods of the above (A) and (B), the composition of the urethane resin is analyzed, and in particular, a polyisocyanate and a component (a polyol or an amine) which reacts therewith are analyzed. Next, in order to confirm the chemical shifts of an urethane bond and an urea bond corresponding to the polyisocyanate, the following procedure is performed. By the use of the polyisocyanate and one component which reacts therewith (selected from a long-chain polyol, an acid group-containing diol, a polyamine, and water), a reaction product is prepared. For example, when a long-chain polyol and an acid group-containing diol are both used, a reaction product (I) of the polyisocyanate and the long-chain polyol, a reaction product (II) of the polyisocyanate and the acid group-containing diol, and a reaction product (III) of the polyisocyanate and water are each prepared. The reaction product thus prepared is dissolved in deuterated dimethyl sulfoxide (DMSO-d6) and is then analyzed by a carbon 13 nuclear magnetic resonance method ($^{13}$C-NMR), and the chemical shifts of the urethane bond and the urea bond of each reaction product are confirmed. According to the above example, the chemical shift of the urethane bond is confirmed from the reaction products of the above (I) and (II), and the chemical shift of the urea bond is confirmed from the reaction product of the above (III). Subsequently, from the chemical shifts thus obtained, the peaks of the urethane bond and the urea bond are identified, and from the rate between the integrated values of the peaks, the molar ratio of the urethane bond to the urea bond of the urethane resin is calculated.

Content of Polymer Particles and Physical Properties of Urethane Resin

The content of the polymer particles containing the above urethane polymer is 0.5 to 3 times that of the pigment. When the addition amount of the polymer particles is less than 0.5 times that of the pigment, a sufficient scratch resistance cannot be obtained. In addition, when the addition amount of the polymer particles is more than 3 times that of the pigment, the viscosity of the ink is liable to be increased, and the clogging recovery property and the intermittent ejection stability cannot be obtained.

The acid value of the urethane resin is from 5 to 30 mgKOH/g. When the acid value is less than 5 mgKOH/g, the storage stability of the urethane resin in an aqueous ink is degraded, and clogging is liable to occur at a high temperature. On the other hand, when the acid value is more than 30 mgKOH/g, since the urethane resin is liable to swell with water, the viscosity of the ink is liable to be increased, and in addition, the water resistance of a printed media is degraded.

The content of the urethane resin in the ink is preferably from 0.1 to 20.0 percent by mass and more preferably from 1.0 to 15.0 percent by mass.

The gel fraction of the urethane resin is preferably 50% or more. When the gel fraction is less than 50%, the water resistance and the chemical resistance are degraded. The gel fraction is more preferably 60% to 90%, and when the gel fraction is more than 90%, the scratch resistance starts to be degraded.

In addition, the number of the urethane groups is 10 times or more that of the urea groups. Since the number of the urethane groups is set to 10 times or more that of the urea groups, the balance in hydrogen bond between the urethane resin and an anionic group contributing to the dispersion of the pigment is optimized, and as a result, the film strength can be simultaneously satisfied together with the clogging recovery property and the intermittent ejection stability. The film strength is not likely to be obtained only by the urethane bond, and by an urea bond formed by a polyfunctional amine and an isocyanate, a film having a high strength can be obtained. The number of the urethane bonds is preferably from 10 to 30 times that of the urea bonds. When the number of the urethane bonds is less than 10 times that of the urea bonds, although the film strength is increased, the ink is liable to adhere to the vicinity of a nozzle of an ink-jet head, and the clogging recovery property and the intermittent ejection stability are degraded. When the urethane resin is present in the vicinity of the pigment, the scratch resistance of a printed media is improved; however, when the number of the urea groups is excessively large, problems caused thereby may arise in some cases.

As a method for adjusting the rate of the urethane groups/the urea groups in the urethane resin, for example, there may be mentioned a method in which the use amount of an amine compound is adjusted when the urethane resin is synthesized and a method in which when the urethane resin is transferred into water, the residual rate is adjusted.

The method in which the use amount of an amine compound is adjusted when the urethane resin is synthesized is performed by controlling the amount of the urea bond which is generated from a reaction between an amine compound and an isocyanate group. First, various types of urethane resins are formed by changing the use amount of the amine compound, and the rates of the urethane groups/the urea groups are calculated. From the molar ratio thus obtained, a calibration curve showing the relationship between the use amount of the amine compound and the molar ratio is formed, and by the use of this calibration curve, the use amount of the amine compound necessary for synthesis of an urethane resin having a target molar ratio is determined. In this case, the reason the calibration curve is formed is that since the reactivity varies depending on the type of amino compound, the same molar ratio may not be always obtained by the same addition amount.

When the urethane resin is transferred into water, as a method for adjusting the residual rate of an unreacted isocyanate group, first, during a synthetic reaction of the urethane resin, the residual rate of an isocyanate group with respect to the use amount of a polyisocyanate is confirmed by a Fourier transform infrared spectroscopic photometer (FT-IR). The residual rate of the isocyanate group can be adjusted by changing the reaction time and/or the use amount of the polyisocyanate. In addition, when the residual rate of the isocyanate group becomes the same value as a desired rate of the urethane groups/the urea groups, ion-exchange water is added to the reaction system. For example, in the case in which an urethane resin in which the rate of the urethane groups/the urea groups is 15 times is synthesized, when the residual rate of the isocyanate group of the polyisocyanate thus used reaches a predetermined value, ion-exchange water is added. In addition, in Examples which will be described later, by the method described above, the rate of the urethane bonds/the urea bonds of the urethane resin was adjusted.

In addition, although a polyamine may be used as a component which reacts with a polyfunctional polyisocyanate, a chain extender, a cross-linking agent, or the like, when an isocyanate group is allowed to react with an amine, an urea bond is formed. Hence, when a polyamine is used, the use amount thereof is preferably determined so that the rate of the urethane groups/the urea groups in the urethane resin is set to a target rate.

1.1.3. Aqueous Medium

The ink-jet ink according to this embodiment may use an aqueous medium, such as water or a mixed solvent containing water and a water-soluble organic solvent. In the invention, an aqueous ink containing at least water as an aqueous medium is preferably used. As the water, ion-exchange water (deionized water) is preferably used.

The water-soluble organic solvent is not particularly limited as long as being water soluble, and for example, a monovalent or a polyvalent alcohol, such as a (poly)alkylene glycol, a glycol ether, acetin, or diacetin; a nitrogen-containing polar solvent, such as 2-pyrrolidone or N-methyl-2-pyrrolidone; or a sulfur-containing polar solvent, such as dimethyl sulfoxide (DMSO), may be used. However, if adversely influencing the ink-jet ink, a solvent to be used is required to be removable by an evaporator or the like. The content (percent by mass) of the water soluble organic solvent in the ink is preferably from 3.0 to 50.0 percent by mass based on the total mass of the ink.

1.1.4. Other Additives

Besides the components described above, the ink-jet ink according to this embodiment may contain, if needed, a water soluble organic compound which is a solid at room temperature, and for example, the water soluble organic compound includes a polyalcohol, such as trimethylolpropane or trimethylolethane, or an urea derivative, such as urea or ethylene urea. Furthermore, the ink-jet ink according to this embodiment may contain, if needed, various types of additives, such as a surfactant, a pH controller, an antirust agent, an antiseptic agent, a fungicide, an antioxidant, an anti-reducing agent, an evaporation promoter, a chelate agent, and a water-soluble resin.

1.1.5. Applications and Effects

The ink-jet ink according to this embodiment is an ink-jet ink using a pigment, and since the content of the polymer particles containing an urethane polymer which includes at least repeating units derived from a polycarbonate diol, repeating units derived from an alicyclic isocyanate, and repeating units derived from an acid group-containing diol, which has an acid value from 5 to 30 mgKOH/g, and in which the number of urethane groups is 10 times or more the number of urea groups is from 0.5 to 3 times the content of the pigment, an ink-jet ink capable of recording an image excellent in scratch resistance while the clogging recovery property is secured can be provided.

In general, the decrease in clogging recovery property is caused by evaporation of water from a nozzle of an ink-jet head. In order to improve the clogging recovery property, even when water evaporates to a certain extent from an ink present in the vicinity of the nozzle of the ink-jet head, and the interaction between the urethane resin and the pigment is enhanced, the pigment and the resin are required to maintain a stable dispersion state without being agglomerated. Although having a relatively low acid value, the urethane resin used for the ink-jet ink according to this embodiment includes the structure formed of a polyfunctional polyisocyanate having at least one type structure selected from the group consisting of an allophanate structure, a biuret structure, an uretdione structure, and an isocyanurate structure, and hence, a three-dimensionally and complicatedly tangled structure is formed. Accordingly, in the ink-jet ink according to this embodiment, even when evaporation of water is promoted, repulsion between the urethane resin and the pigment is likely to be generated by an electrostatic action and/or a repulsive force. As a result, compared to an ink in which a related urethane resin is used, the scratch resistance of a printed media is improved, and the dispersion state of the pigment is stably maintained, so that the clogging recovery property can be improved.

As described above, by the ink-jet ink according to this embodiment, an ink-jet ink capable of recording an image excellent in scratch resistance while the clogging recovery property is secured, which could not be obtained by an urethane resin used for a related ink, can be provide, that is, an ink capable of simultaneously solving the two problems can be provided. Hence, when recording is performed by an ink-jet recording method in which recording is performed on a recording medium by ejecting the ink-jet ink described above received in an ink cartridge which will be described below from an ink-jet type recording head, while the clogging recovery property is secured, an image excellent in scratch resistance can be recorded.

1.2. Ink Cartridge

An ink cartridge according to this embodiment is an ink cartridge which has an ink receiving portion receiving the above ink-jet ink according to this embodiment. As the structure of the ink cartridge, there may be mentioned an ink receiving portion formed of a negative pressure generating member chamber which receives a negative pressure generating member holding an ink in an impregnated state by a negative pressure and an ink receiving chamber which receives an ink so as not to be impregnated by the negative pressure generating member.

In addition, the ink receiving portion may be formed such that the total mass of an ink is held in an impregnated state by the negative pressure generating member without using the ink receiving chamber as described above, or the ink receiving portion may also be formed such that the total mass of an ink is received so as not to be impregnated without using the negative pressure generating member. Furthermore, an ink cartridge in which the ink receiving portion and a recording head are both provided may also be used.

By the ink cartridge according to this embodiment, an ink cartridge having an ink receiving portion which receives an ink capable of recording an image excellent in scratch resistance while the clogging recovery property is secured can be provided.

1.3. Ink-Jet Recording Method

Next, an ink-jet recording method using the ink-jet ink according to this embodiment will be described.

The ink-jet recording method according to this embodiment is an ink-jet recording method recording an ink ejected from an ink-jet type recording head on a recording medium, and the ink to be used is the above ink-jet ink according to this embodiment.

As a recording device used for the ink-jet recording method according to this embodiment, an ink-jet recording device is preferable, and although the ink-jet recording device is not particularly limited, a drop-on-demand type ink-jet recording device is preferable. As the drop-on-demand type ink-jet recording device, for example, a device using a piezoelectric element recording method which performs recording by a piezoelectric element arranged in a recording head or a device using a thermal jet recording method which performs recording with thermal energy generated by a heat generating resistance element, such as a heater, arranged in a recording head may be mentioned, and the above recording methods may both be used. In addition, the ink-jet ink according to this embodiment may be advantageously used, for example, for an ink-jet recording method in which an ink is ejected from an ink-jet recording head having an ejection nozzle surface processed by an ink-repelling treatment.

As described above, since the ink-jet ink according to this embodiment is able to record an image excellent in scratch resistance while the clogging recovery property is secured, by performing recording using the ink-jet ink as described above, while the clogging recovery property is secured, an image excellent in scratch resistance can be recorded. In addition, by the features described above, as the ink-jet recording method according to this embodiment, a method in which mechanical energy generated by an electrostrictive element is applied to an ink is particularly preferable.

2. Examples

Hereinafter, although the invention will be described in more detail with reference to Experimental Examples and Comparative Examples, the invention is not limited to those examples at all. In addition, described as the component amount represents "percent by mass" unless otherwise particularly noted.

2.1. Preparation of Urethane Resin

Preparation of Polycarbonate-Based Urethane Resin Emulsion A

Into a reaction chamber equipped with a stirrer, a reflux condenser tube, and a thermometer, 1,500 g of a polycarbonate diol a (reaction product of 1,6-hexanediol and dimethyl carbonate, molecular weight: 2,000) obtained by the method described below, 320 g of 2,2-dimethylol propionic acid (DMPA), and 1,347 g of 2-pyrrolidone (boiling point: 245° C.) were charged under a nitrogen flow, and DMPA was dissolved by heating to 60° C. Subsequently, 1,245 g of 4,4'-dicyclohexylmethane diisocyanate and 2.6 g of an urethanation catalyst, XK-614 (manufactured by Kusumoto Chemicals, Ltd.) were added and heated to 90° C., and an urethanation reaction was performed over 5 hours, so that an isocyanate-terminated urethane prepolymer was obtained.

After the reaction mixture thus obtained was cooled to 80° C., 220 g of triethanolamine was added to and mixed with the above mixture. From the mixture thus obtained, 4,340 g was extracted and was added to a mixed solution of 5,400 g of water and 22 g of triethanolamine with vigorous stirring. Next, after 1,500 g of ice was charged, 42 g of 2-methyl-1,5-pentanediamine aqueous solution at a concentration of 35% was added, so that a chain extension reaction was performed. Next, the solvent was distilled off so that the solid component concentration was 30%, and as a result, a polycarbonate-based urethane resin emulsion A (urethane resin component: 30%, water: 64%, and 2-pyrrolidoen: 6%) was obtained.

Manufacturing of Polycarbonate Diol A

Into a 5-L glass-made separable flask equipped with a stirrer, a distillate trap, and a pressure control device, as raw materials, 615 g of 1,6-hexanediol (1,6-HD), 1,015 g of diphenyl carbonate, and 2.6 mL of magnesium acetate tetrahydrate aqueous solution (concentration: 3.4 g/L, magnesium acetate tetrahydrate: 22 mg) were charged while nitrogen gas replacement was performed. The inside temperature was then increased to 150° C. to 160° C. with stirring, so that the content was dissolved by heating. Subsequently, after the pressure was decreased to 26 kPa over 2 minutes, while phenol was removed out of the system, a reaction was performed for 100 minutes. Next, after the pressure was decreased to 9.0 kPa over 100 minuets, the pressure was further decreased to 0.6 kPa over 40 minutes, and the reaction was continued. Subsequently, the temperature was increased to 170° C., and a reaction was performed for 100 minutes while phenol and an unreacted dihydroxy compound were removed out of the system, so that a polycarbonate diol a-containing composition was obtained. By the use of a gel permeation chromatography (GPC) L7100 system manufactured by Hitachi, Ltd., the styrene-conversion weight average molecular weight measured using THF as a solvent was 2,000.

Preparation of Polycarbonate-Based Urethane Resin Emulsion B

In the preparation of the polycarbonate-based urethane resin emulsion A, except that 320 g of 2,2-dimethylol propionic acid (DMPA) was changed to 192 g, and 128 g of 1,6-hexanediol was added, a polycarbonate-based urethane resin emulsion B (urethane resin component: 30%, water 64%, 2 pyrrolidone: 6%) was obtained in a manner similar to that described above.

Preparation of Polycarbonate-Based Urethane Resin Emulsion C

In the preparation of the polycarbonate-based urethane resin emulsion A, except that 1,500 g of the polycarbonate diol a (reaction product of 1,6-hexanediol and dimethyl carbonate, molecular weight: 2,000) was changed to 1,340 g, and 320 g of 2,2-dimethylol propionic acid (DMPA) was changed to 420 g, a polycarbonate-based urethane resin emulsion C (urethane resin component: 30%, water 64%, 2 pyrrolidone: 6%) was obtained in a manner similar to that described above.

Preparation of Polycarbonate-Based Urethane Resin Emulsion D

In the preparation of the polycarbonate-based urethane resin emulsion A, except that 1,500 g of the polycarbonate diol a (reaction product of 1,6-hexanediol and dimethyl carbonate, molecular weight: 2,000) was changed to 1,477 g, and 42 g of 2-methyl-1,5-pentanediamine aqueous solution at a concentration of 35% was changed to 63 g, a polycarbonate-based urethane resin emulsion D (urethane resin component: 30%, water 64%, 2 pyrrolidone: 6%) was obtained in a manner similar to that described above.

Preparation of Polycarbonate-Based Urethane Resin Emulsion E

In the preparation of the polycarbonate-based urethane resin emulsion A, except that a polycarbonate diol b (reaction product of 1,6-hexanediol and dimethyl carbonate formed by a method similar to that of the polycarbonate diol a, molecular weight: 500) was used instead of using the polycarbonate diol a, a polycarbonate-based urethane resin emulsion E (urethane resin component: 30%, water 64%, 2 pyrrolidone: 6%) was obtained in a manner similar to that described above.

Preparation of Polycarbonate-Based Urethane Resin Emulsion F

In the preparation of the polycarbonate-based urethane resin emulsion A, except that a polycarbonate diol c (reaction product of 1,6-hexanediol and dimethyl carbonate formed by a method similar to that of the polycarbonate diol a, molecular weight: 3,000) was used instead of using the polycarbonate diol a, a polycarbonate-based urethane resin emulsion F (urethane resin component: 30%, water 64%, 2 pyrrolidone: 6%) was obtained in a manner similar to that described above.

Preparation of Polycarbonate-Based Urethane Resin Emulsion G

In the preparation of the polycarbonate-based urethane resin emulsion A, except that instead of using 1,245 g of 4,4'-dicyclohexylmethane diisocyanate, 800 g of 4,4'-dicyclohexylmethane diisocyanate and 445 g of hydrogenated xylylene diisocyanate were used, a polycarbonate-based urethane resin emulsion G (urethane resin component: 30%, water 64%, 2 pyrrolidone: 6%) was obtained in a manner similar to that described above.

Preparation of Polycarbonate-Based Urethane Resin Emulsion H

In the preparation of the polycarbonate-based urethane resin emulsion A, except that 1,500 g of the polycarbonate diol a (reaction product of 1,6-hexanediol and dimethyl carbonate, molecular weight: 2,000) was changed to 1,340 g, and 128 g of 1,5-pentanediol was added, a polycarbonate-based urethane resin emulsion H (urethane resin component:

30%, water 64%, 2 pyrrolidone: 6%) was obtained in a manner similar to that described above.

Preparation of Polycarbonate-Based Urethane Resin Emulsion I

In the preparation of the polycarbonate-based urethane resin emulsion A, except that a polycarbonate diol d (reaction product of 1,6-hexanediol and dimethyl carbonate formed by a method similar to that of the polycarbonate diol a, molecular weight: 450) was used instead of using the polycarbonate diol a, a polycarbonate-based urethane resin emulsion I (urethane resin component: 30%, water 64%, 2 pyrrolidone: 6%) was obtained in a manner similar to that described above.

Preparation of Polycarbonate-Based Urethane Resin Emulsion J

In the preparation of the polycarbonate-based urethane resin emulsion A, except that a polycarbonate diol e (reaction product of 1,6-hexanediol and dimethyl carbonate formed by a method similar to that of the polycarbonate diol a, molecular weight: 3,100) was used instead of using the polycarbonate diol a, a polycarbonate-based urethane resin emulsion J (urethane resin component: 30%, water 64%, 2 pyrrolidone: 6%) was obtained in a manner similar to that described above.

Preparation of Polycarbonate-Based Urethane Resin Emulsion K

In the preparation of the polycarbonate-based urethane resin emulsion A, except that 1,500 g of the polycarbonate diol a (reaction product of 1,6-hexanediol and dimethyl carbonate, molecular weight: 2,000) was changed to 2,145 g, and 1,245 g of 4,4'-dicyclohexylmethane diisocyanate was changed to 800 g, a polycarbonate-based urethane resin emulsion K (urethane resin component: 30%, water 64%, 2 pyrrolidone: 6%) was obtained in a manner similar to that described above.

Preparation of Polycarbonate-Based Urethane Resin Emulsion L

In the preparation of the polycarbonate-based urethane resin emulsion A, except that the polycarbonate diol a (reaction product of 1,6-hexanediol and dimethyl carbonate, molecular weight: 2,000) was changed to a polyoxypropylene glycol (molecular weight: 2,000), a polycarbonate-based urethane resin emulsion L (urethane resin component: 30%, water 64%, 2 pyrrolidone: 6%) was obtained in a manner similar to that described above.

Preparation of Polycarbonate-Based Urethane Resin Emulsion M

In the preparation of the polycarbonate-based urethane resin emulsion A, except that the polycarbonate diol a (reaction product of 1,6-hexanediol and dimethyl carbonate, molecular weight: 2,000) was changed to a polyester polyol (molecular weight: 2,000), a polycarbonate-based urethane resin emulsion M (urethane resin component: 30%, water 64%, 2 pyrrolidone: 6%) was obtained in a manner similar to that described above.

Preparation of Polycarbonate-Based Urethane Resin Emulsion N

In the preparation of the polycarbonate-based urethane resin emulsion A, except that 320 g of 2,2-dimethylol propionic acid (DMPA) was changed to 320 g of 1,6-hexanediol, a polycarbonate-based urethane resin emulsion N (urethane resin component: 30%, water 64%, 2 pyrrolidone: 6%) was obtained in a manner similar to that described above.

Preparation of Polycarbonate-Based Urethane Resin Emulsion O

In the preparation of the polycarbonate-based urethane resin emulsion A, except that 320 g of 2,2-dimethylol propionic acid (DMPA) was changed to 128 g, and 192 g of 1,6-hexanediol was added, a polycarbonate-based urethane resin emulsion O (urethane resin component: 30%, water 64%, 2 pyrrolidone: 6%) was obtained in a manner similar to that described above.

Preparation of Polycarbonate-Based Urethane Resin Emulsion P

In the preparation of the polycarbonate-based urethane resin emulsion A, except that 1,500 g of the polycarbonate diol a (reaction product of 1,6-hexanediol and dimethyl carbonate, molecular weight: 2,000) was changed to 796 g, and 320 g of 2,2-dimethylol propionic acid (DMPA) was changed to 1,024 g, a polycarbonate-based urethane resin emulsion P (urethane resin component: 30%, water 64%, 2 pyrrolidone: 6%) was obtained in a manner similar to that described above.

Preparation of Polycarbonate-Based Urethane Resin Emulsion Q

In the preparation of the polycarbonate-based urethane resin emulsion A, except that 1,500 g of the polycarbonate diol a (reaction product of 1,6-hexanediol and dimethyl carbonate, molecular weight: 2,000) was changed to 1,460 g, and 42 g of 2-methyl-1,5-pentanediamine aqueous solution at a concentration of 35% was changed to 69 g, a polycarbonate-based urethane resin emulsion Q (urethane resin component: 30%, water 64%, 2 pyrrolidone: 6%) was obtained in a manner similar to that described above.

2.2. Preparation of Pigment Dispersion Liquid

Pigment Dispersion Liquid 1

After 500 g of ion-exchange water and 15 g of carbon black were mixed together, stirring was performed by a rocking mill using 1-mm zirconia beads for 30 minutes, so that the pigment was pre-wetted. After 4,485 g of ion-exchange water was added to the mixture thus prepared, the mixture was dispersed by a high pressure homogenizer. In this step, the average particle diameter of the pigment was 110 nm. After the dispersion liquid thus prepared was charged into a high pressure container and was pressurized at a pressure of 3 MPa, ozone water having an ozone concentration of 100 ppm was charged, so that the surface of the pigment was processed by an ozone oxidation treatment. Subsequently, after this dispersion liquid was adjusted to have a pH of 9.0 using a sodium hydroxide aqueous solution at a concentration of 0.1 mol/L, the concentration of a pigment solid component was adjusted, so that a pigment dispersion liquid 1 was obtained. In the pigment dispersion liquid 1, a self-dispersion pigment in which a —COONa group was bonded to the particle surface was contained, and the content of the pigment was 30%.

Pigment Dispersion Liquid 2

A mixture was obtained by mixing 500 g of carbon black, 1,000 g of a water-soluble resin, and 14,000 g of water. As the water-soluble resin, there was used a resin obtained by neutralizing a styrene-acrylic acid copolymer having an acid value of 100 mgKOH/g and a weight average molecular weight of 10,000 with a sodium hydroxide aqueous solution at a concentration of 0.1 mol/L. After this mixture was dispersed for 1 hour with a rocking mill using 1-mm zirconia beads, impurities were removed by a centrifugal treatment, and reduced-pressure filtration was further performed using a microfilter (manufactured by Millipore) having a pore size of 5.0 μm. Subsequently, the concentration of the pigment solid component was adjusted, so that a pigment dispersion liquid 2 having a pH of 9.0 was obtained. In the pigment dispersion liquid 2, a pigment dispersed by a water-soluble resin (resin dispersion agent) was contained, and the content of the pigment and the content of the resin were 30.0% and 15.0%, respectively.

Pigment Dispersion Liquid 3

After a reaction chamber equipped with a stirrer, a thermometer, a reflux tube, and a dripping funnel was replaced with nitrogen, 300 parts by mass of methyl ethyl ketone was charged thereinto. Subsequently, after 40 parts by mass of styrene, 40 parts by mass of methyl methacrylate, parts by mass of lauryl acrylate, 5 parts by mass of lauryl methacrylate, 5 parts by mass of methoxy polyethylene glycol 400 acrylate AM-90G (manufactured by Shin Nakamura Chemical Co., Ltd.), 5 parts by mass of acrylic acid, 0.2 parts by mass of ammonium persulfate, and 0.3 parts by mass of t-dodecyl mercaptan were charged into the dripping funnel and dripped to the reaction chamber over 4 hours, so that a polymer dispersion agent was obtained by a polymerization reaction. Next, methyl ethyl ketone was added into the reaction chamber, so that a solution of the polymer dispersion agent at a concentration of 40 percent by mass was prepared.

The polymer dispersion agent solution was subjected to a measurement performed by a gel permeation chromatography (GPC) L7100 system manufactured by Hitachi, Ltd. using THF as a solvent, and it was found that the styrene-conversion weight average molecular weight was 58,000. In addition, the polydispersity (Mw/Mn) was 3.1.

In addition, after 40 parts by mass of the polymer dispersion agent solution, 30 parts by mass of Chromo Fine Blue C. I. Pigment Blue 15: 3 (trade name, manufactured by Dainichiseika Color & Chemicals Mfg. Co., Ltd., hereinafter, also referred to as "PB15:3" in some cases) as a cyan pigment, 100 parts by mass of a sodium hydroxide aqueous solution at a concentration of 0.1 mol/L, and 30 parts by mass of methyl ethyl ketone were mixed together, a dispersion treatment was performed for 8 passes by an Ultimizer 25005 (trade name, manufactured by Sugino Machine Ltd.). Subsequently, after 300 parts by mass of ion-exchange water was added, the total mass of methyl ethyl ketone and a part of water were distilled off using a rotary evaporator, and neutralization was then performed using a sodium hydroxide aqueous solution at a concentration of 0.1 mol/l, so that the pH was adjusted to 9. Next, while the volume average particle diameter of the cyan pigment was measured by a particle size distribution meter, dispersion was performed until the volume average particle diameter reached 100 nm, and filtration was then performed using a membrane filter having a size of 3 μm, so that a pigment dispersion liquid containing 20 percent by mass of a solid component (the polymer dispersion agent and the pigment) was obtained.

2.3. Preparation of Ink

Examples 1 to 12 and Comparative Examples 1 to 8

After the following components were mixed together and sufficient stirred, a reduced-pressure filtration was performed using a microfilter (manufactured by Millipore) having a pore size of 5.0 μm, so that an ink of each of Examples 1 to 12 and Comparative Examples 1 to 8 was prepared. In addition, the acid value, the gel fraction, and the value of urethane groups/urea groups of the urethane resin used in Examples and Comparative Examples were measured by the methods described above. The ink compositions and the physical properties of Examples are shown in Table 1, and the ink compositions and the physical properties of Comparative Examples are shown in Table 2.

TABLE 1

| Example | 1 | 2 | 3 | 4 | 5 | 6 | 7 | 8 | 9 | 10 | 11 | 12 |
|---|---|---|---|---|---|---|---|---|---|---|---|---|
| Pigment (pigment dispersion liquid 1) | 5 | — | — | 5 | — | — | 5 | — | — | 5 | — | — |
| Pigment (pigment dispersion liquid 2) | — | 5 | — | — | 5 | — | — | 5 | — | — | 5 | — |
| Pigment (pigment dispersion liquid 3) | — | — | 5 | — | — | 5 | — | — | 5 | — | — | 5 |
| Urethane resin No. | A | B | C | D | A | E | F | G | H | I | J | K |
| Addition amount of urethane resin | 7.5 | 7.5 | 7.5 | 7.5 | 10 | 7.5 | 7.5 | 7.5 | 7.5 | 7.5 | 7.5 | 7.5 |
| Weight average molecular weight of polycarbonate diol | 2000 | 2000 | 2000 | 2000 | 2000 | 500 | 3000 | 2000 | 2000 | 450 | 3100 | 2000 |
| Acid value (mgKOH/g) | 10 | 6 | 15 | 10 | 10 | 10 | 10 | 10 | 10 | 10 | 10 | 10 |
| Gel fraction (%) | 82 | 88 | 71 | 91 | 82 | 62 | 52 | 76 | 85 | 50 | 61 | 45 |
| Urethane groups/urea groups | 15 | 15 | 15 | 10 | 15 | 15 | 15 | 15 | 15 | 15 | 15 | 15 |
| Resin/pigment | 1.5 | 1.5 | 1.5 | 1.5 | 2 | 1.5 | 1.5 | 1.5 | 1.5 | 1.5 | 1.5 | 1.5 |

TABLE 2

| Comparative Example | 1 | 2 | 3 | 4 | 5 | 6 | 7 | 8 |
|---|---|---|---|---|---|---|---|---|
| Pigment (pigment dispersion liquid 1) | 5 | — | — | 5 | — | — | 5 | — |
| Pigment (pigment dispersion liquid 2) | — | 5 | — | — | 5 | — | — | 5 |
| Pigment (pigment dispersion liquid 3) | — | — | 5 | — | — | 5 | — | — |
| Urethane resin No. | L | M | N | O | P | Q | A | A |
| Addition amount of urethane resin | 7.5 | 7.5 | 7.5 | 7.5 | 7.5 | 7.5 | 2 | 15.5 |

TABLE 2-continued

| Comparative Example | 1 | 2 | 3 | 4 | 5 | 6 | 7 | 8 |
|---|---|---|---|---|---|---|---|---|
| Weight average molecular weight of polycarbonate diol | — (PPG3000) | — (Polyester polyol) | 2000 | 2000 | 2000 | 2000 | 2000 | 2000 |
| Acid value (mgKOH/g) | 10 | 10 | 10 | 4 | 32 | 10 | 10 | 10 |
| Gel fraction (%) | 72 | 84 | 93 | 84 | 62 | 71 | 82 | 82 |
| Urethane groups/urea groups | 15 | 15 | 15 | 15 | 15 | 9 | 15 | 15 |
| Resin/pigment | 1.5 | 1.5 | 1.5 | 1.5 | 1.5 | 1.5 | 0.4 | 3.1 |

In addition, in Tables 1 and 2, the pigment (pigment dispersion liquid 1) indicates the solid component (percent by mass) of the pigment of the pigment dispersion liquid 1. As the components other than those shown in Tables 1 and 2, there were contained 10 percent by mass of 2-pyrrolidone (2-P), 5 percent by mass of 1,2-hexanediol (1,2-HD), 5 percent by mass of propylene glycol (PG), 5 percent by mass of dipropylene glycol (DPG), 0.5 percent by mass of tri-ethanolamine (TEA), 0.02 percent by mass of ethylenediamine tetraacetate disodium salt (EDTA), and ion-exchange water as the balance (by addition of the balance, the total of all the components of the ink becomes 100.0 percent by mass).

2.4. Evaluation Test

After each ink formed as described above was filled in an ink cartridge, the ink cartridge was mounted in an ink-jet recording device (trade name PX-G930, manufactured by Seiko Epson Corp.) ejecting an ink from a recording head by energy generate by a piezoelectric element, the device being partially modified so that a platen could be heated. In this example, the recording duty of a solid image recorded under the condition in which one ink droplet in an amount of 25 ng±10% was applied to a unit area of 1/720 inch×1/720 inch was defined as 100%. As the recording conditions, the temperature was set to 25° C., and the relative humidity was set to 50%.

2.4.1. Scratch Resistance Test

In accordance with JIS L0849 2013, the scratch resistance test was performed with a load of 200 g by reciprocatively rubbing a sample 100 times using a Gakushin-type scratch resistance tester AB-301 of Tester Sangyo Co., Ltd. By the use of the above ink-jet recording device, a recorded media in which a solid image of 1.0 inch×0.5 inch having a recording duty of 100% was recorded on a film (trade name: OPP, plain roll, 25 μm thick, manufactured by Toyobo Co., Ltd.) was obtained. Printing was performed at a dot density of 1,440 dpi×1,440 dpi and at a platen temperature of 60° C. Evaluation was performed in such a way that a KANAKIN cotton fabric was pressed on the solid image of the recorded media one day after printing. Subsequently, the dirt of the KANAKIN cotton fabric, the dirt of a non-recorded portion, and the degree of peeling of a printed portion were confirmed by visual inspection, and the evaluation of the scratch resistance was performed in accordance with the following criteria.

Evaluation Criteria

A: Dart of the KANAKIN cotton fabric and dart of the non-recorded portion were hardly observed, and the degree of peeling of the printed portion was hardly confirmed.
B: Dart of the KANAKIN cotton fabric and dart of the non-recorded portion were observed but were very slight, and the degree of peeling of the printed portion was hardly confirmed.
C: Dart of the KANAKIN cotton fabric and dart of the non-recorded portion were observed, and the degree of peeling of the printed portion was slightly confirmed.
D: Dart of the KANAKIN cotton fabric and dart of the non-recorded portion were remarkably observed, and the degree of peeling of the printed portion was apparent.
E: Dart of the KANAKIN cotton fabric and dart of the non-recorded portion were remarkably observed, and the degree of peeling of the printed portion was remarkably confirmed.

2.4.2. Intermittent Ejection Stability Test

A printer PX-G930 (manufactured by Seiko Epson Corp.) was used for an intermittent ejection stability test. By the use of this printer, evaluation of the ejection stability in intermittent printing was performed under the conditions in which the temperature and the relative humidity were set to 40° C. and 20%, respectively. First, normal ejection of the ink composition from all the nozzles was confirmed. Subsequently, after the ink composition was ejected on A4-size photographic paper (photo gloss paper, manufactured by Seiko Epson Corp.), a rest time was taken for 2 minutes under the conditions in which the temperature and the relative humidity were set to 40° C. and 20%, respectively, and the ink composition was again ejected on A4-size photographic paper. In the second ejection, the position of the dot of the first droplet adhered onto the A4-size photographic paper displaced from a target position was measured using an optical microscope. Based on the positional displacement of the dot thus obtained, the intermittent characteristic was evaluated in accordance with the following criteria.

Evaluation Criteria

A: The positional displacement of the dot was 10 μm or less.
B: The positional displacement of the dot was from more than 10 μm to 20 μm.
C: The positional displacement of the dot was from more than 20 μm to 30 μm.
D: The positional displacement of the dot was from more than 30 μm to 40 μm.
E: The positional displacement of the dot was more than 40 μm.

2.4.3. Continuous Printing Stability Test

A printer PX-G930 (manufactured by Seiko Epson Corp.) was partially modified so that the platen could be heated. The ink composition obtained as described above was filled in an ink cartridge of this printer. In addition, the ink composition was ejected on a fabric of an A4-size OPP film at a resolution of 720 dpi in a longitudinal direction by 720 dpi in a lateral direction and was then dried at 70° C. for 5 minutes, so that a recorded sample of a cyan solid pattern was formed. Under the conditions in which the temperature and the relative humidity were set to 40° C. and 20%, respectively, the ink composition was ejected by repeating the operation described above for up to 8 hours, and the time at which the liquid droplet of the ink composition could not be stably ejected from the nozzle was measured. Based on the time thus obtained, the continuous printing stability was evaluated by the following criteria.

Evaluation Criteria

A: Even after 8 hours from the start of the ejection, non-ejection and unstable ejection were not observed even once.

B: After 2 to less than 8 hours from the start of the ejection, non-ejection and unstable ejection were not observed.

C: After 1 to less than 2 hours from the start of the ejection, non-ejection and unstable ejection were not observed.

D: After 30 minutes to less than 1 hour from the start of the ejection, non-ejection and unstable ejection were not observed.

E: After less than 30 minutes from the start of the ejection, non-ejection, unstable ejection, and the like were observed.

2.4.4. Clogging Recovery Property Test

After the ink composition obtained as described above was filled in an ink cartridge of a printer PX-G930 (manufactured by Seiko Epson Corp.) and was printed on A4-size OPP paper at a resolution of 720 dpi in a longitudinal direction and 720 dpi in a lateral direction, the ejection of the ink composition from all the nozzles was confirmed. Subsequently, the printer was left for 30 days under the conditions in which the temperature and the relative humidity were set to 40° C. and 20%, respectively. After the printer was left for 30 days, the ink composition was again ejected from all the nozzles, and cleaning was repeatedly performed until printing could be performed at the same level as that of the initial stage, so that the number of cleanings was counted. Based on the number of cleanings, the clogging recovery property was evaluated by the following criteria.

Evaluation Criteria

A: By cleaning performed 1 to 3 times, the ink composition could be ejected from all the nozzles.

B: By cleaning performed 4 to 6 times, the ink composition could be ejected from all the nozzles.

C: By cleaning performed 7 to 9 times, the ink composition could be ejected from all the nozzles.

D: By cleaning performed 10 times or more, the ink composition could be ejected from all the nozzles.

E: By cleaning, the ink composition could not be ejected from all the nozzles.

As for the evaluation results of each test, the results of Examples are shown in Table 3, and the results of Comparative Examples are shown in Table 4.

TABLE 3

| Example | 1 | 2 | 3 | 4 | 5 | 6 | 7 | 8 | 9 | 10 | 11 | 12 |
|---|---|---|---|---|---|---|---|---|---|---|---|---|
| Scratch resistance test | A | A | A | B | B | A | B | A | A | A | B | A |
| Intermittent ejection stability test | A | A | B | B | A | A | B | A | A | C | A | A |
| Continuous printing stability test | A | A | B | A | A | B | A | A | A | B | A | A |
| Clogging recovery property test | A | B | A | A | A | B | B | A | A | B | B | B |

TABLE 4

| Comparative Example | 1 | 2 | 3 | 4 | 5 | 6 | 7 | 8 |
|---|---|---|---|---|---|---|---|---|
| Scratch resistance test | D | D | D | A | D | A | E | E |
| Intermittent ejection stability test | A | A | A | A | A | D | A | E |
| Continuous printing stability test | A | A | B | A | A | A | A | D |
| Clogging recovery property test | A | A | A | D | A | D | A | E |

2.5. Evaluation Results

From Examples and Comparative Examples, it was found that in Examples, all the evaluation results thereof were superior to those of Comparative Examples, the intermittent ejection stability was satisfied, the clogging and the like are not generated, and in addition, an image excellent in scratch resistance could be recorded. In particular, the results of Examples 1 to 9 were significantly superior. On the other hand, in Comparative Examples, the clogging recovery property and the recording of an image excellent in scratch resistance could not be simultaneously obtained.

The invention is not limited to the embodiments described above and may be variously changed and modified. For example, the invention includes the structure substantially the same as that described in the embodiment (such as the structure having the same function, method, and result, or the structure having the same purpose and advantage). In addition, the invention includes the structure in which a non-substantial portion of the structure described in the embodiment is replaced. In addition, the invention includes the structure having the same operation and effect or achieving the same purpose as that described in the embodiment. In addition, the invention includes the structure in which a related art is added to the structure described in the embodiment.

This application claims priority to Japanese Patent Application No. 2016-022437 filed on Feb. 9, 2016. The entire disclosure of Japanese Patent Application No. 2016-022437 is hereby incorporated herein by reference.

What is claimed is:

1. An ink-jet ink using a pigment, the ink comprising:
   polymer particles containing an urethane polymer which includes at least repeating units derived from a polycarbonate diol, repeating units derived from an alicyclic isocyanate, and repeating units derived from an acid group-containing diol, which has an acid value of from 5 to 30 mgKOH/gm, and in which the number of urethane groups is 10 times or more the number of urea groups,
   wherein the content of the polymer particles is from 0.5 to 3 times the content of the pigment, and
   wherein the alicyclic isocyanate includes a blocked alicyclic polyisocyanate compound in which 80% or more of the aromatic ring of an aromatic polyisocyanate is hydrogenated.

2. The ink-jet ink according to claim 1, wherein the weight average molecular weight of the polycarbonate diol is from 500 to 3,000.

3. An ink cartridge comprising:
   an ink receiving portion receiving an ink,
   wherein the ink is the ink-jet ink according to claim 2.

4. An ink-jet recording method comprising:
   ejecting an ink from a ink-jet type recording head to record an image on a recording medium,
   wherein the ink is the ink-jet ink according to claim 2.

5. The ink-jet ink according to claim 1, wherein the urethane polymer further includes repeating units derived from an alkylene glycol.

6. An ink cartridge comprising:
an ink receiving portion receiving an ink,
wherein the ink is the ink-jet ink according to claim 5.

7. An ink-jet recording method comprising:
ejecting an ink from a ink-jet type recording head to record an image on a recording medium,
wherein the ink is the ink-jet ink according to claim 5.

8. The ink-jet ink according to claim 1, wherein the alicyclic isocyanate is at least one type selected from the group consisting of 4,4'-dicyclohexylmethane diisocyanate and hydrogenated xylylene diisocyanate.

9. An ink cartridge comprising:
an ink receiving portion receiving an ink,
wherein the ink is the ink-jet ink according to claim 8.

10. An ink-jet recording method comprising:
ejecting an ink from a ink-jet type recording head to record an image on a recording medium,
wherein the ink is the ink-jet ink according to claim 8.

11. The ink-jet ink according to claim 1, wherein the polymer particles have a gel fraction of 50% or more.

12. An ink cartridge comprising:
an ink receiving portion receiving an ink,
wherein the ink is the ink-jet ink according to claim 11.

13. An ink-jet recording method comprising:
ejecting an ink from a ink-jet type recording head to record an image on a recording medium,
wherein the ink is the ink-jet ink according to claim 11.

14. An ink cartridge comprising:
an ink receiving portion receiving an ink,
wherein the ink is the ink-jet ink according to claim 1.

15. An ink-jet recording method comprising:
ejecting an ink from a ink-jet type recording head to record an image on a recording medium,
wherein the ink is the ink-jet ink according to claim 1.

* * * * *